United States Patent
Miller et al.

(10) Patent No.: US 9,915,175 B2
(45) Date of Patent: Mar. 13, 2018

(54) SEAL RUNNER WITH CONTROLLED OIL LUBRICATION

(71) Applicant: United Technologies Corporation, Hartford, CT (US)

(72) Inventors: Jonathan L. Miller, Ware, MA (US); M Rifat Ullah, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 291 days.

(21) Appl. No.: 14/800,400

(22) Filed: Jul. 15, 2015

(65) Prior Publication Data

US 2017/0016350 A1   Jan. 19, 2017

(51) Int. Cl.

| | |
|---|---|
| *F01D 11/00* | (2006.01) |
| *F01D 25/16* | (2006.01) |
| *F01D 25/18* | (2006.01) |
| *F16J 15/40* | (2006.01) |
| *F01D 5/02* | (2006.01) |
| *F16J 15/44* | (2006.01) |
| *F16J 15/324* | (2016.01) |

(52) U.S. Cl.
CPC ............ *F01D 25/183* (2013.01); *F01D 5/02* (2013.01); *F01D 11/003* (2013.01); *F01D 11/005* (2013.01); *F01D 25/166* (2013.01); *F01D 25/186* (2013.01); *F16J 15/324* (2013.01); *F16J 15/40* (2013.01); *F16J 15/441* (2013.01); *F05D 2220/323* (2013.01); *F05D 2240/581* (2013.01); *F05D 2240/60* (2013.01); *F05D 2260/98* (2013.01)

(58) Field of Classification Search
CPC ........ F01D 25/183; F01D 5/02; F01D 11/003; F01D 11/005; F01D 25/186; F01D 25/166; F16J 15/324; F16J 15/40; F16J 15/441; F16J 15/442; F05D 2220/323; F05D 2240/5811; F05D 2240/60; F05D 2260/98

See application file for complete search history.

(56) References Cited

U.S. PATENT DOCUMENTS

| | | | |
|---|---|---|---|
| 2,158,832 A | 5/1939 | Podbielniak | |
| 2,956,824 A | 10/1960 | Kuchler | |
| 3,252,744 A | 5/1966 | Angus | |
| 3,308,318 A | 3/1967 | Dunaiski | |
| 3,704,019 A | 11/1972 | McHugh | |
| 3,976,165 A | 8/1976 | Pilarczyk | |
| 4,159,888 A | 7/1979 | Thompson | |
| 5,272,868 A | 12/1993 | Ciokajlo | |
| 5,464,227 A * | 11/1995 | Olson | F16J 15/3404 277/400 |
| 5,547,287 A | 8/1996 | Zeidan | |
| 8,074,995 B2 | 12/2011 | Vasagar | |

(Continued)

OTHER PUBLICATIONS

EP search report for EP16179676.8 dated Nov. 11, 2016.

*Primary Examiner* — Dwayne J White
*Assistant Examiner* — Justin A Pruitt
(74) *Attorney, Agent, or Firm* — O'Shea Getz P.C.

(57) ABSTRACT

A system is provided associated with an engine of an aircraft. The system includes a ring, a runner and at least one radially-oriented hole associated with the runner that is configured to supply oil to an interface between the runner and the ring. The at least one hole is contained within an axial projection of the ring.

18 Claims, 4 Drawing Sheets

(56) References Cited

U.S. PATENT DOCUMENTS

| | | |
|---|---|---|
| 8,490,982 B2 | 7/2013 | Roche |
| 2006/0062504 A1 | 3/2006 | Wilton et al. |
| 2007/0085278 A1* | 4/2007 | Davis ............... F01D 25/183 |
| | | 277/411 |
| 2007/0108704 A1 | 5/2007 | Craig et al. |
| 2011/0068541 A1 | 3/2011 | Durling |
| 2012/0269310 A1 | 10/2012 | Brady |
| 2013/0004109 A1* | 1/2013 | Metzger ............... F16C 33/58 |
| | | 384/473 |
| 2013/0034438 A1 | 2/2013 | Jahn |
| 2013/0077907 A1 | 3/2013 | Duffy |
| 2014/0241851 A1 | 8/2014 | Demitraszek et al. |
| 2014/0286599 A1 | 9/2014 | Devitt |
| 2014/0369832 A1 | 12/2014 | Blais |
| 2015/0049968 A1 | 2/2015 | Garrison |
| 2015/0337964 A1* | 11/2015 | Kaiser ............... F04B 53/18 |
| | | 277/551 |
| 2016/0238137 A1 | 8/2016 | Clark et al. |
| 2016/0273657 A1 | 9/2016 | Amador et al. |

\* cited by examiner

SEAL RUNNER WITH CONTROLLED OIL LUBRICATION

BACKGROUND

Advanced, high-performance engines will require improved performance main shaft bearing compartment seals while also being required to meet more aggressive cost, weight, size, environmental and reliability metrics. Carbon seals may be manufactured to enable an engine and bearing compartment to function with minimal impact on Thrust Specific Fuel Consumption (TSFC), Thermal Management Systems (TMSs) and Lubrication Systems. Advanced engines require seals with improved wear resistance, improved performance, and improved reliability in order to meet customer, user, or program metrics.

Experience has demonstrated elevated seal wear and seal runner distress/deterioration, which results in increased air leakage characteristics and impacts the ability of a bearing compartment to contain oil. Future engines may experience elevated rubbing velocities relative to existing engine platforms, which could demand alternate solutions. A contacting, dry running seal can be limited by the capabilities of the materials selected. At elevated rubbing velocities, testing and experience have demonstrated that available materials are not able to withstand these conditions. Alternate solutions that have the high rubbing velocity capability, such as clearance seals (Knife Edge Lab, Controlled Gap, etc.) and Lift-Off Seals, present unique risks; system requirements may prevent their utilization.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to one aspect of the present disclosure, a system is provided associated with an engine of an aircraft. This system includes a ring, a runner and at least one radially-oriented hole associated with the runner that is configured to supply oil to an interface between the runner and the ring. The at least one hole is contained within an axial projection of the ring.

According to another aspect of the present disclosure, a runner is provided and configured to interface to a ring as part of a sealing arrangement associated with an engine of an aircraft. This runner includes an annulus configured to collect oil. The runner also includes at least one radially-oriented hole contained within an axial projection of the ring that is configured to supply oil from the annulus to an interface between the ring and the runner.

According to still another aspect of the present disclosure, a method is provided for providing oil to an interface between a runner and a ring in an engine of an aircraft. This method includes steps of receiving, by the runner, oil from a source of oil; conveying the received oil to an annulus; and conveying at least a first portion of the oil in the annulus to the interface via at least one radially-oriented hole that is contained within an axial projection of the ring.

An annulus may be included and configured to collect oil. A first portion of the collected oil may be configured to be conveyed to the interface between the runner and the ring via the at least one hole.

The annulus may be arranged as a three-hundred sixty degree annulus.

A second portion of the collected oil may be configured to pass-thru the system in an axial direction.

At least a second radially-oriented hole may be included and configured to provide the oil to the annulus.

A second ring may be included and located forward of the ring.

At least one of the ring or the second ring may be segmented.

At least one of the ring or the second ring may be comprised of carbon.

The runner may be configured to rotate relative to the ring.

The ring may be coupled to a shaft of the engine. The ring may be coupled to fixed structure of the engine.

The runner may be configured to interface to a second ring as part of the sealing arrangement.

The runner may be configured to avoid supplying oil from the annulus to a second interface between the second ring and the runner.

The second ring may be located forward of the ring.

The received oil may be conveyed to the annulus via a second at least one radially-oriented hole.

The method may also include a step of conveying a second portion of the oil in the annulus in an axial direction via a manifold.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
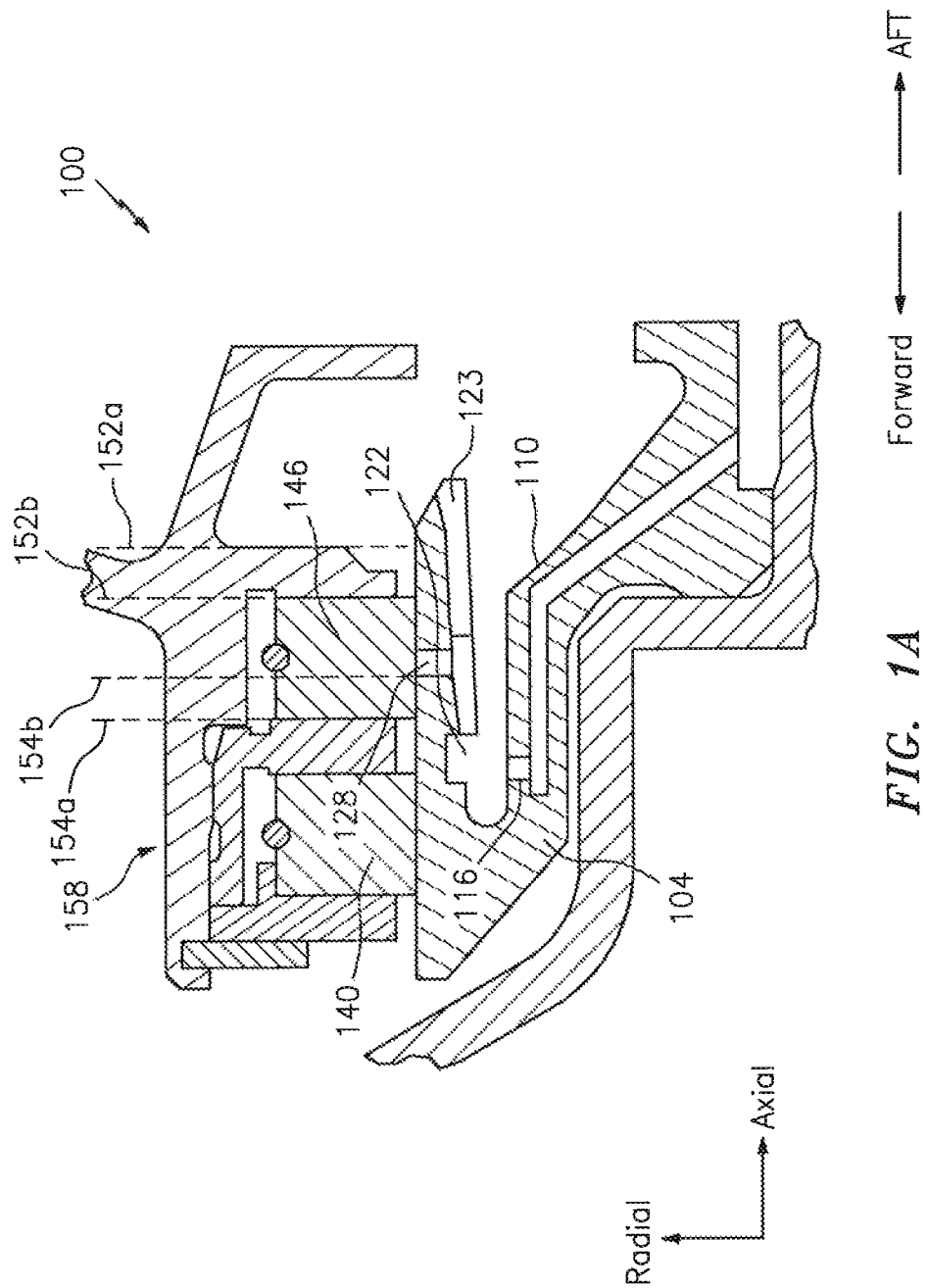
FIGS. 1A-1B illustrate a system that may be used to provide a seal runner with controlled sealing interface oil lubrication in accordance with aspects of the disclosure.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a seal or seal runner with a controlled sealing interface. In some embodiments, a radial seal or associated seal runner may be provided or utilized. The sealing interface may facilitate sealing with respect to one or more fluids, such as for example oil that is used in lubricating a bearing.

Aspects of the disclosure are directed to a seal runner with a controlled sealing interface. In some embodiments, oil may be used to lubricate the interface. The interface may be formed by one or more seals, such as for example a segmented circumferential (radial) seal. The runner may contain a set number of upstream feed holes that then may directly (or even indirectly) feed into an annulus (e.g., a three-hundred sixty degree annulus) in an underneath, inner diameter (ID) section of the runner outer portion. This annulus may serve as a reservoir for the oil, such that a dam of oil may develop. The oil may enter a set number of slots that may be spaced (e.g., evenly spaced) around the circumference. These slots may be comprised of at least two different types. Each slot type may be at a set number and spacing so that a predetermined, optimum amount of oil enters each slot type.

The slot type that would be used for carbon element interface "oil wetting" may be a relatively low quantity (e.g., 1-3 slots), in order to properly control the amount of oil in the interface and the seal oil loss (i.e., weepage) characteristics. This carbon element interface "oil wetting" may be targeted to the runner outer diameter (OD) to carbon element ID sealing interface, which may enable the seal materials to operate at higher rubbing velocities and maintain acceptable wear rates. The optimum location for this interface "oil wetting" targeting may be set to the bearing compartment side (i.e., oil side) ring of the seal arrangement in order to help control the seal oil loss/weepage characteristics. Any air side sealing ring might not be exposed to this direct targeting based on the calculated/expected amount of axial excursions/displacements.

Figure 1B:
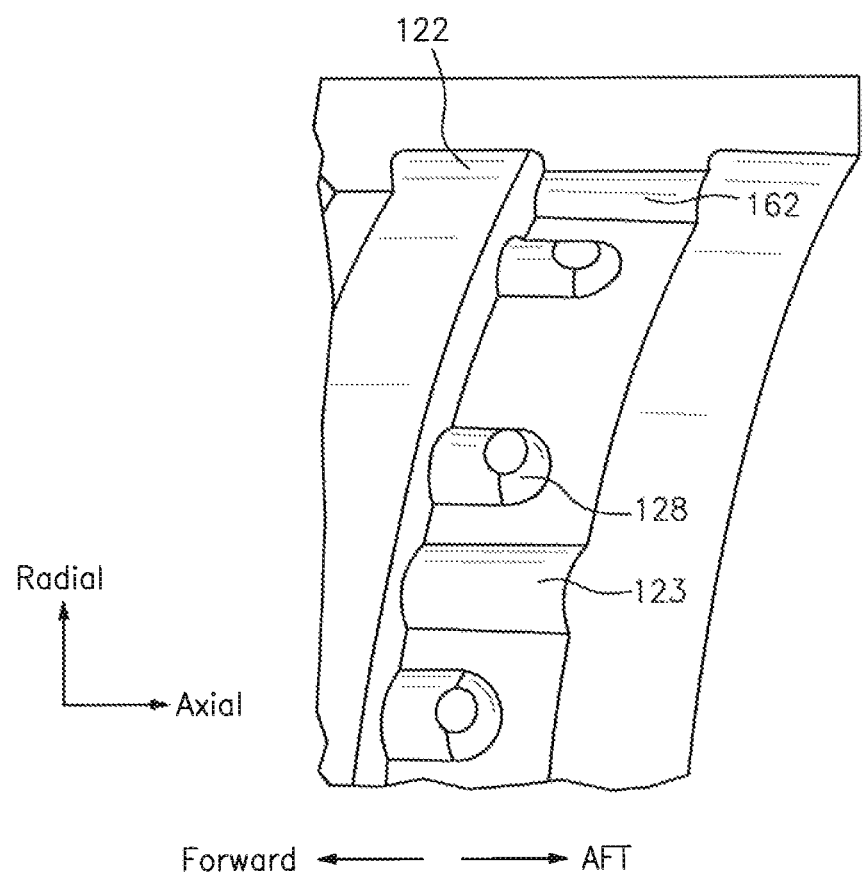

Referring now to FIGS. 1A-1B, a system 100 is shown. The system 100 may be configured to provide a seal runner with controlling sealing interface oil lubrication.

The system 100 may include a seal runner 104. The runner 104 may include one or more pieces and may include welded/bonded features to permit machining and drilling. Use of more than one piece may facilitate ease in manufacturing and assembly of the system 100.

In association with the runner 104 there may be a compartment side oil passage 110. The passage 110 may be used in the conveyance of oil, such as for example oil received from one or more sources (e.g., an oil jet—not shown in FIG. 1).

The passage 110 and/or the runner 104 may be associated with one or more radially-oriented holes (as denoted by reference character 116). The holes 116 may be configured to feed oil to an annulus/dam 122 and associated slots 123. The annulus 122 may function as a reservoir in terms of a collection or pooling of the oil. The collection/pooling of the oil may be based on a centrifugal force imposed on the oil.

The runner 104 and/or the annulus 122 may be associated with one or more holes (e.g., one or more lubricating holes) 128 that may provide for optimum interface "wetting" and weepage control. Via the holes 128, a predetermined amount of oil may be delivered across a portion of the runner 104 for purposes of cleaning, cooling, and/or lubricating. The slots 123 may include, or be associated with, a taper (as denoted via reference character 162) to encourage an axial flow.

The system 100 may include one or more rings, such as for example an archbound or limited contact air side ring 140 and an oil side ring 146. The rings 140 and 146, in combination with the runner 104, may provide for a sealing arrangement. The use of two rings, e.g. rings 140 and 146, may be used to provide for (a degree of) redundancy in the sealing arrangement. The ring 146 may boarder a bearing compartment annulus, whereas the ring 140 may boarder a non-bearing compartment annulus; e.g., an air plenum. However, the present disclosure is not limited to such a configuration.

The runner 104 may rotate relative to the rings 140 and 146. For example, the runner 104 may rotate in association with the rotation of an engine shaft, whereas the rings 140 and 146 may be held circumferentially (i.e., rotationally) stationary and may be coupled to (fixed) engine structure via one or more anti-rotation devices. However, the rings 140 and 146 may be permitted to translate/move radially and reciprocate with the runner 104. The rings 140 and 146 may also or alternatively be permitted to translate/move axially and radially via internal clearances; however, may be biased toward the sealing surfaces via springs and air pressure forces.

One or both of the rings 140 and 146 may be segmented. The rings 140 and 146 may be made of one or more elements/materials, e.g., carbon.

Superimposed in FIG. 1A are reference lines 152a, 152b, 154a, and 154b. Reference line 152a represents the edge of a chamfer of the runner 104. For purposes of stability/integrity, it might be undesirable for the ring 146 to abut against this very edge 152a. As such, the reference line 152b may represent a clearance (e.g., a minimum distance) from the edge 152a to position the aft or right-most edge of the ring 146. The reference line 154a may represent the forward or left-most edge of the ring 146. The reference line 154b may represent a clearance (e.g., a minimum distance) from the edge 154a for positioning the forward or left-most edge of the hole(s) 128. The hole(s) 128 may be located so that the hole(s) 128 are contained within the footprint (e.g., an axial projection) of the ring 146 based on a gapping analysis/study (e.g., based on excursions/displacements of one or more components of the engine over the operating range of the engine). More particularly, the holes 128 may be positioned axially between the axial sides of the ring 146; e.g., between reference lines 152b and 154a.

In some embodiments, the system 100 may include a scupper system (a portion of which is denoted by reference character 158 in FIG. 1A). The scupper system 158 may be used to drain to a benign location any excess oil that may leak out of the seal.

Based on the arrangement of the system 100, the system 100 may be configured to control/meter the amount of oil that is delivered to the interface between the ring 146 and the runner 104. For example, a first portion of the oil in the annulus 122 may pass-thru the system 100 in, e.g., the axial direction (potentially as part of a manifold) and a second portion of the oil in the annulus 122 may be projected in the radial direction to the interface between the ring 146 and the runner 104 via the hole(s) 128. The amount of oil may be controlled/metered by tailoring, for example, the number of radial holes 128 and/or the diameter of the radial holes 128 to provide a desired flow therethrough.

Figure 2:
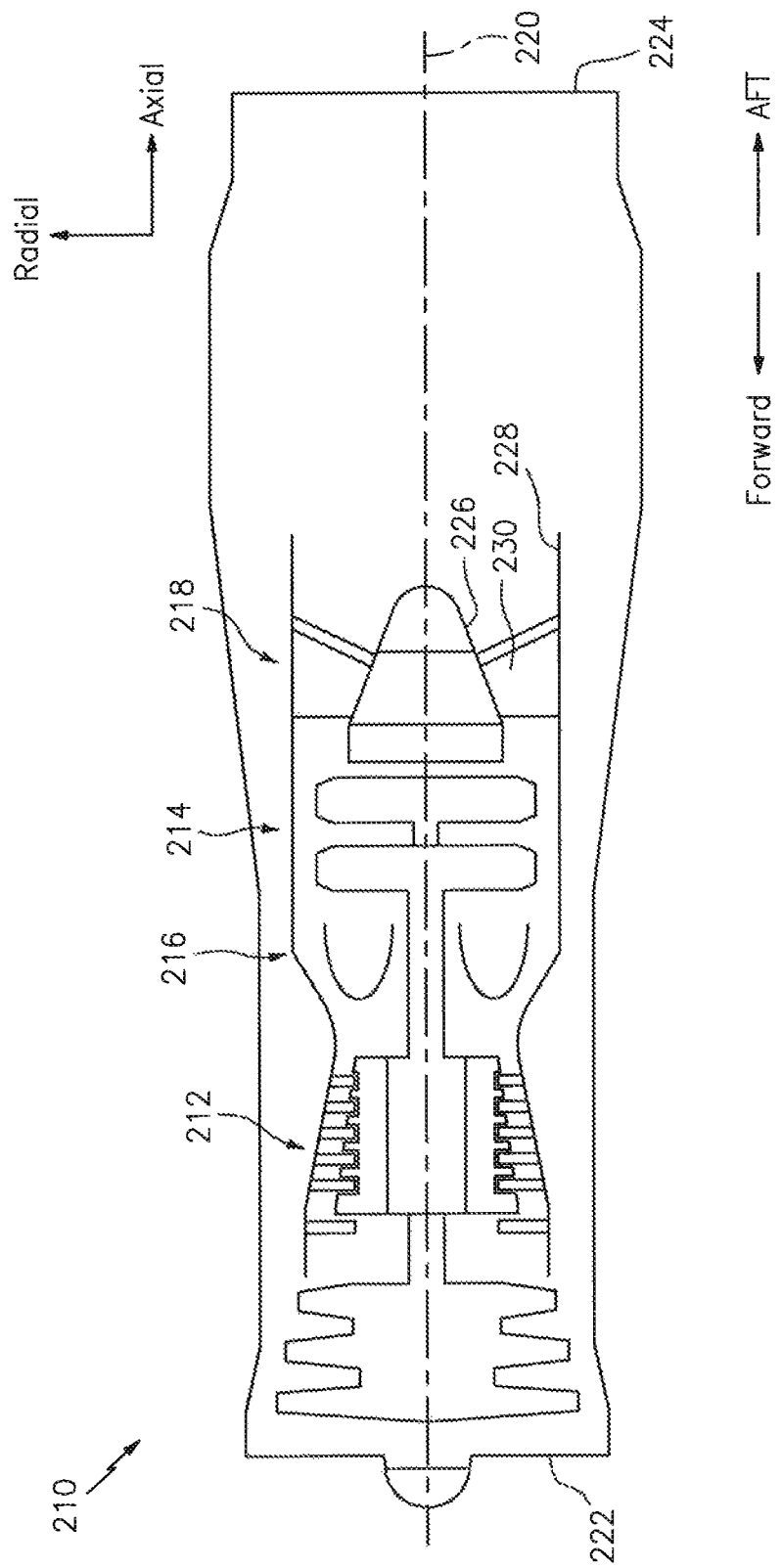
FIG. 2 illustrates an exemplary gas turbine engine in accordance with aspects of this disclosure.

Aspects of the disclosure may be applied in connection with an aircraft, or portion thereof. For example, aspects of the disclosure may be applied in connection with a gas turbine engine. FIG. 2 is a side-sectional illustration of an exemplary gas turbine engine 210. The engine 210 includes a compressor section 212, a turbine section 214 and one or more engine hot sections. The engine hot sections may include, for example, a first engine hot section 216 configured as a combustor section and a second engine hot section 218 configured as an augmentor section. The compressor section 212, the first engine hot section 216, the turbine section 214 and the second engine hot section 218 may be sequentially aligned along an axial centerline 220 between a forward engine airflow inlet 222 and an aft engine airflow exhaust 224. The second engine hot section 218 may include a first (e.g., annular, radial inner) duct case 226, a second (e.g., annular, radial outer) duct case 228, and one or more hot section vanes 230.

The engine 210 is illustrative. Aspects of the disclosure may be applied in connection with other engine types or configurations.

Figure 3:
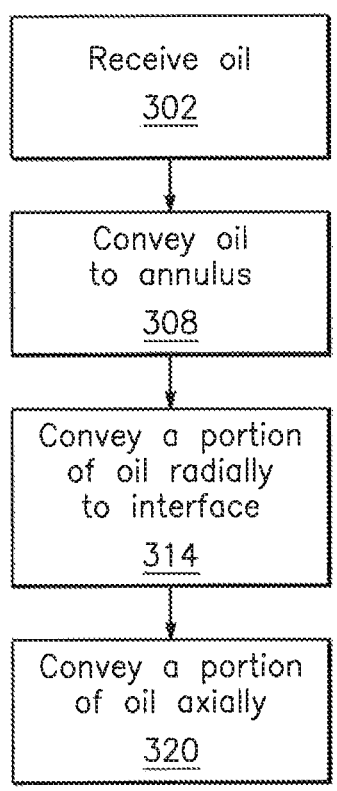
FIG. 3 illustrates a method for providing oil to an interface between a runner and a ring in accordance with aspects of this disclosure.

Referring to FIG. 3, a flow chart of a method 300 is shown. The method 300 may be executed by, or in conjunction with, one or more of the components, devices, or systems described herein. The method 300 may be used to supply oil to one or more interfaces between one or more rings (e.g., ring 146) and a runner (e.g., runner 104).

In block 302, oil may be received by a runner. The oil may be received from one or more sources, such as for example an oil jet.

In block 308, the received oil of block 302 may be conveyed to an annulus (where the annulus may be included as part of, or associated with, the runner). The conveyance of the oil in block 308 may be facilitated by one or more holes, e.g., the hole 116.

In block 314, at least a portion of the oil in the annulus from block 308 may be conveyed to an interface between the runner and a ring in a radial direction. The conveyance of the oil in block 314 may be facilitated by one or more holes, e.g., the hole 128.

In block 320, at least a portion of the oil in the annulus from block 308 may be conveyed in an axial direction, potentially in conjunction with a manifold.

Technical effects and benefits of this disclosure an extension of seal lifetime. Aspects of the disclosure may provide for seal reliability metric improvements, enhanced user/customer satisfaction, and a reduction/minimization in terms of aircraft/engine overhaul cycle requirements. Improved/enhanced durability and wear life may be realized, particularly in the context of high speed applications. Furthermore, such features may be obtained without sacrificing engine performance or fuel efficiency. Aspects of the disclosure may be implemented with a marginal increase in terms of oil that is utilized relative to conventional sealing arrangements.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system associated with an engine, comprising:
   a ring;
   a second ring;
   a runner;
   an annulus configured to collect oil; and
   at least one radially-oriented hole associated with the runner that is configured to supply oil from the annulus to an interface between the runner and the ring, wherein the at least one hole is contained within an axial projection of the ring,
   wherein the runner is configured to interface to the second ring at a second interface, and
   wherein the runner is configured to avoid supplying oil from the annulus to the second interface.

2. The system of claim 1, wherein a first portion of the collected oil is configured to be conveyed to the interface between the runner and the ring via the at least one hole.

3. The system of claim 2, wherein the annulus is arranged as a three-hundred sixty degree annulus.

4. The system of claim 2, wherein a second portion of the collected oil is configured to pass-thru the system in an axial direction.

5. The system of claim 2, further comprising:
   at least a second radially-oriented hole configured to provide the oil to the annulus.

6. The system of claim 1, further comprising:
   the second ring located forward of the ring.

7. The system of claim 6, wherein at least one of the ring or the second ring is segmented.

8. The system of claim 6, wherein at least one of the ring or the second ring is comprised of carbon.

9. The system of claim 1, wherein the runner is configured to rotate relative to the ring.

10. The system of claim 9, wherein the runner is coupled to a shaft of the engine, and wherein the ring is coupled to fixed structure of the engine.

11. A runner configured to interface to a ring and a second ring as part of a sealing arrangement associated with an engine, the runner comprising:
    an annulus configured to collect oil; and
    at least one radially-oriented hole contained within an axial projection of the ring that is configured to supply oil from the annulus to an interface between the ring and the runner,
    wherein the runner is configured to avoid supplying oil from the annulus to a second interface between the second ring and the runner.

12. The runner of claim 11, wherein the second ring is located forward of the ring.

13. A method comprising:
    receiving, by a runner, oil from a source of oil;
    conveying the received oil to an annulus;
    conveying at least a first portion of the oil in the annulus to an interface between the runner and a ring via at least one radially-oriented hole in the runner that is contained within an axial projection of the ring; and
    avoiding, by the runner, supplying oil from the annulus to a second interface between the runner and a second ring.

14. The method of claim 13, wherein the received oil is conveyed to the annulus via a second at least one radially-oriented hole.

15. The method of claim 13, further comprising:
    conveying a second portion of the oil in the annulus in an axial direction via a manifold.

16. The method of claim 13, wherein the interface includes the runner being in intimate contact with the ring, and wherein the ring is radially outward of the runner such that the interface is a radial interface.

17. The system of claim 1, wherein the interface includes the runner being in intimate contact with the ring, and wherein the ring is radially outward of the runner such that the interface is a radial interface.

18. The runner of claim 11, wherein the interface includes the runner being in intimate contact with the ring, and wherein the ring is radially outward of the runner such that the interface is a radial interface.

* * * * *

UNITED STATES PATENT AND TRADEMARK OFFICE
CERTIFICATE OF CORRECTION

PATENT NO. : 9,915,175 B2
APPLICATION NO. : 14/800400
DATED : March 13, 2018
INVENTOR(S) : Ott et al.

It is certified that error appears in the above-identified patent and that said Letters Patent is hereby corrected as shown below:

In the Specification

Column 3, Line 25, please delete "hearing" and insert --bearing--.

Column 4, Line 19, please delete "152h" and insert --152b--.

Column 5, Line 4, please delete "duet" and insert --duct--.

Signed and Sealed this
Seventeenth Day of April, 2018

Andrei Iancu
*Director of the United States Patent and Trademark Office*